United States Patent
Rossello et al.

(10) Patent No.: US 7,152,352 B2
(45) Date of Patent: Dec. 26, 2006

(54) UNIVERSAL LICENSE PLATE ATTACHMENT SYSTEM

(75) Inventors: Anthony F. Rossello, Howell, MI (US); David B. Declerck, Auburn Hills, MI (US)

(73) Assignee: General Motors Corporation, Detroit, MI (US)

( * ) Notice: Subject to any disclaimer, the term of this patent is extended or adjusted under 35 U.S.C. 154(b) by 51 days.

(21) Appl. No.: 10/780,490

(22) Filed: Feb. 17, 2004

(65) Prior Publication Data

US 2005/0178032 A1    Aug. 18, 2005

(51) Int. Cl.
*G09F 7/00* (2006.01)

(52) U.S. Cl. ........................................ 40/200

(58) Field of Classification Search ............... 40/200, 40/202, 209, 663, 668
See application file for complete search history.

(56) References Cited

U.S. PATENT DOCUMENTS

| | | | | |
|---|---|---|---|---|
| 1,757,587 A | * | 5/1930 | Quinn | 40/209 |
| 4,691,460 A | * | 9/1987 | Kohl | 40/618 |
| 4,970,809 A | * | 11/1990 | Bushbaum | 40/209 |
| 5,671,556 A | * | 9/1997 | Huntley | 40/200 |
| 6,772,545 B1 | * | 8/2004 | Hashim et al. | 40/209 |

* cited by examiner

*Primary Examiner*—Gary C. Hoge
(74) *Attorney, Agent, or Firm*—Laura C. Hargitt

(57) ABSTRACT

A universal attachment system for attaching to a motor vehicle the license plate from a number of countries, even though the locations of the attachment holes of the license plates may be different from country to country. A right nut body has a first plurality of license plate attachment holes, a left nut body has a second plurality of license plate attachment holes, and an attachment panel which carries the left and right nut bodies. The first and second pluralities of license plate attachment holes provides a plurality of pairs of license plate attachment holes for aligning with the license plate mounting holes of any, or all, of a North American, Japanese, Korean, Persian Gulf States and European license plate.

15 Claims, 5 Drawing Sheets

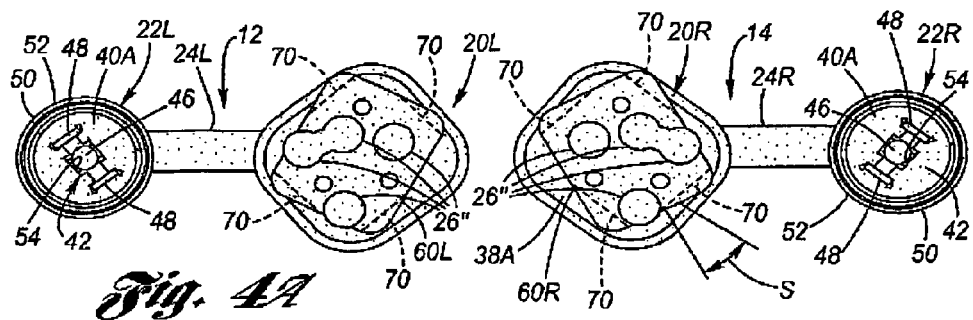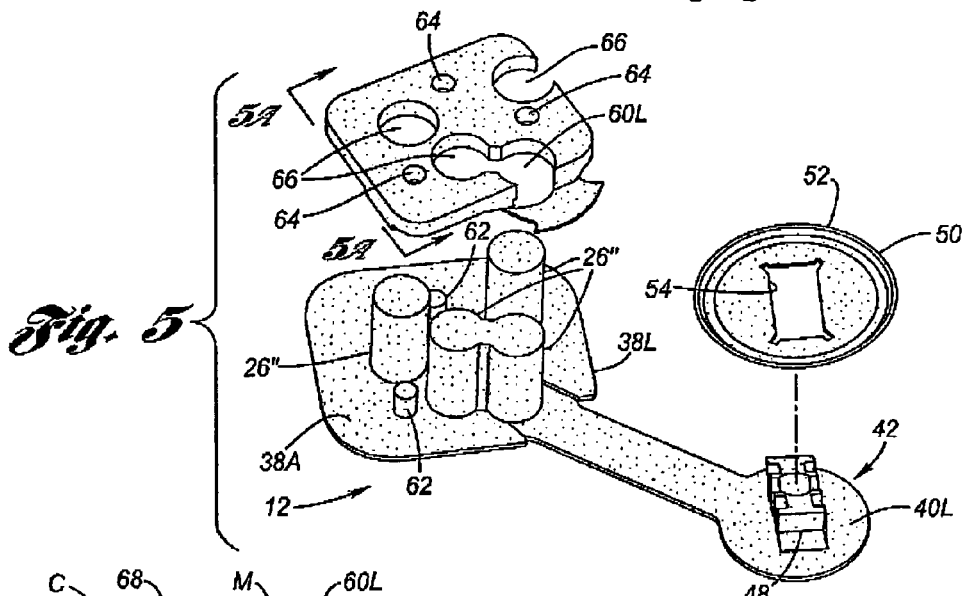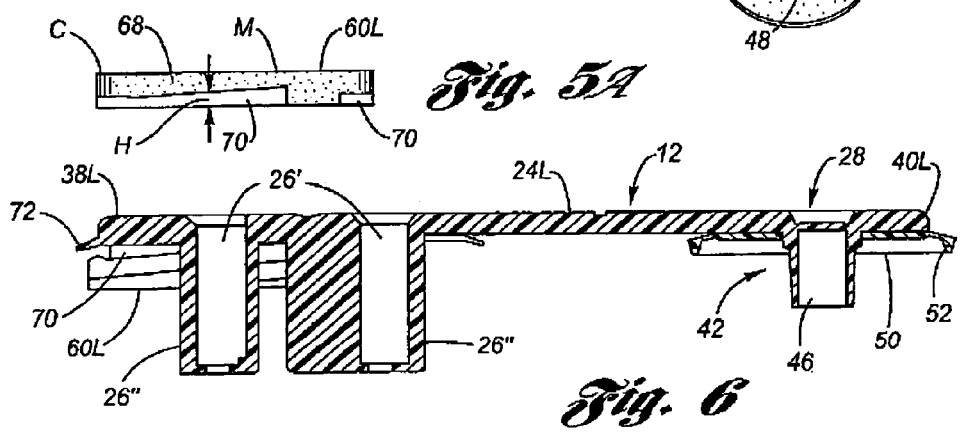

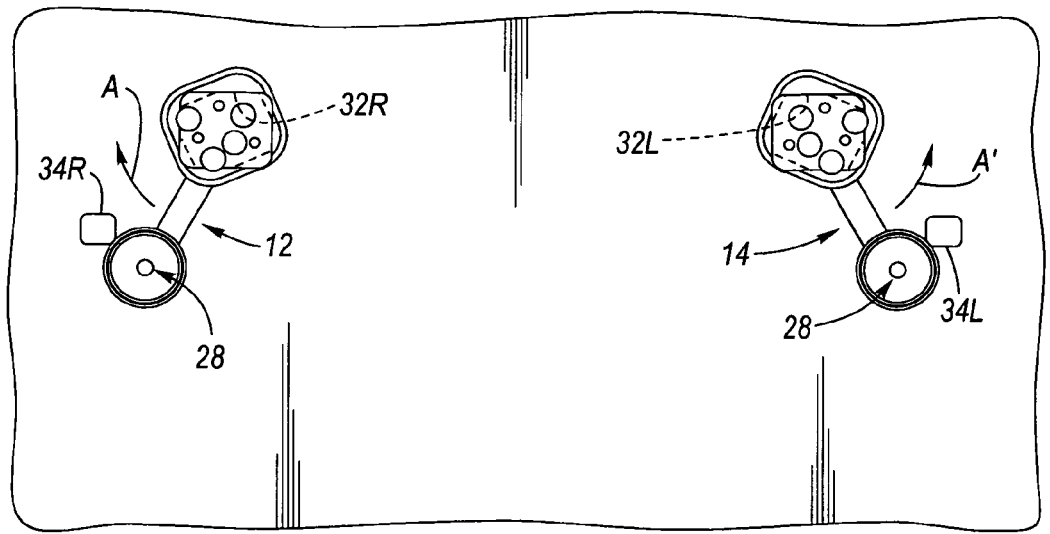
Fig. 7
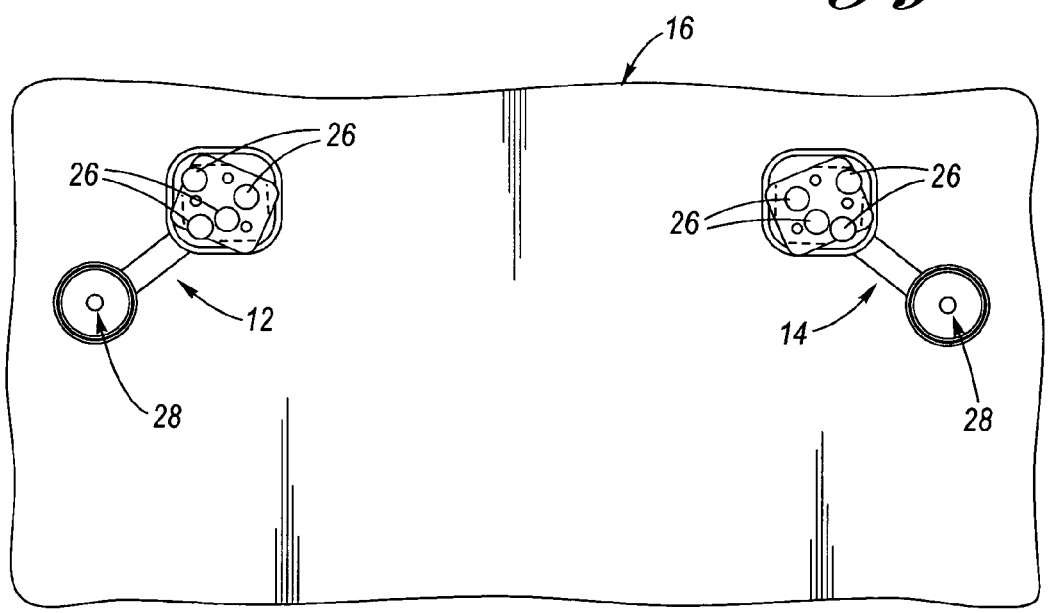
Fig. 8
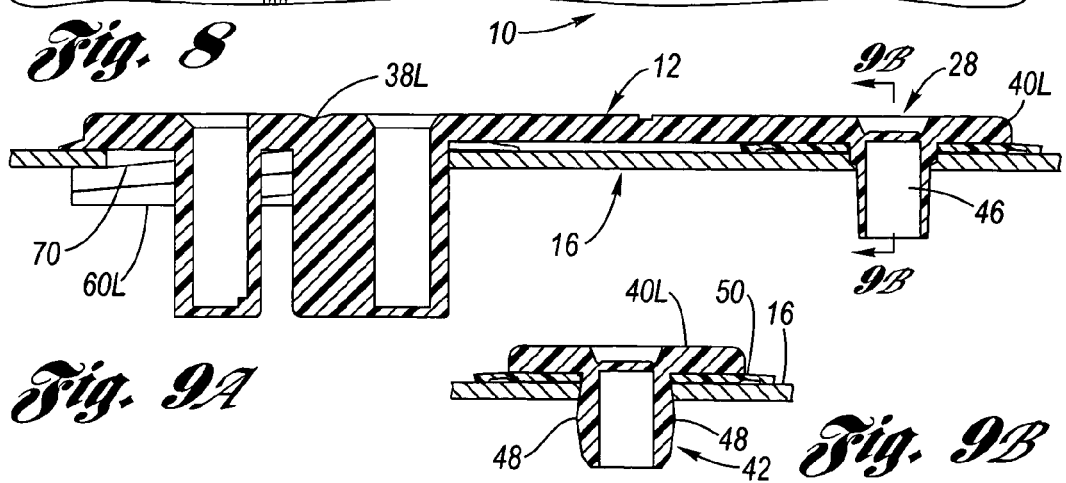
Fig. 9A
Fig. 9B

UNIVERSAL LICENSE PLATE ATTACHMENT SYSTEM

TECHNICAL FIELD

The present invention relates to holders used to attach a license plate to a motor vehicle, and more particularly to a universal license plate attachment system which accommodates differing sizes of license plates that are used in various locations around the world.

BACKGROUND OF THE INVENTION

Motor vehicle regulations around the world require that motor vehicles display a license plate indicative of the registration of that vehicle. The usual attachment of the license plate to a motor vehicle is by threaded fasteners passing through mounting holes of the license plate and then threading into aligned attachment holes of the motor vehicle, for example at the rear deck lid, lift gate, rear deck panel, or bumper.

License plate size is not universal around the world. There are, for example, different size license plates, with different mounting hole locations, used in each of North America, Europe, Japan, Korea, and the Persian Gulf States of the Middle East. Problematically, since automakers ship motor vehicles to a number of countries, the license plate attachment must be correctly chosen to fit the mounting holes of the license plate of the country of destination, and this requires an added cost involved in the customization. In this regard, it is presently customary to provide license plate attachment holes into the vehicle sheet metal specific to the country of destination of the vehicle, or alternatively, to not provide any license plate attachment holes at the manufacturing facility and default to the dealer the job of drilling the license plate attachment holes (which holes are problematic in that they result in exposed metal edges which are prone to rust initiation). Into each attachment hole a respective plastic (nylon) nut is secured, and a threaded fastener is placed respectively through each mounting hole of the license plate and then threaded into the nut. These customary license plate attachment hole options involve a cost impact, part number proliferation, sequencing, scheduling and warranty issues, as well as the need to install plastic appliques to hide unused attachment holes.

Accordingly, what is needed in the art is a license plate attachment system which can somehow universally accommodate different sized license plates used around the world.

SUMMARY OF THE INVENTION

The present invention is a universal attachment system for attaching to a motor vehicle the license plate from any of a number of countries, even though the locations of the attachment holes of the license plates may be different from country to country.

The universal attachment system according to the present invention includes a right nut body, a left nut body, and an attachment panel which carries the left and right nut bodies, and wherein the left and right nut bodies are provided with a plurality of preselected license plate attachment holes.

The left nut body includes a left main nut body component and a left satellite nut body component, wherein preferably a bridge connects the left main nut body component to the left satellite nut body component. Similarly, the right nut body includes a right main nut body component and a right satellite nut body component, wherein preferably a bridge also connects the right main nut body component to the right satellite nut body component. Each of the left and right main nut body components has at least one selected country license plate attachment hole (preferably four selected countries license plate attachment holes), and the left and right satellite nut body components each have provision for a European license plate attachment hole.

The attachment panel has first and second right openings and first and second left openings which are spaced horizontally with respect to the first and second right openings. In this regard, the left main nut body component is attached to the first left opening, the left satellite nut body component is attached to the second left opening, the right main nut body component is attached to the first right opening, and the right satellite nut body component is attached to the second right opening, wherein a plurality of pairs of license plate attachment holes are thereby provided at the attachment panel which are alignable with the mounting holes of various sized license plates.

In the preferred embodiment, each of the left and right main nut body components has a respective left and right entry boss having a complementary shape to that of the first left and right openings, a respective left and right main nut body head, and at least one guide slot formed, respectively, in each sidewall of the left and right entry bosses. Each of the left and right satellite nut body components has a respective satellite nut body head and a respective snap feature attached respectively thereto in depending, perpendicular relation.

In operation of the preferred embodiment, the right entry boss of the right main nut body component is placed through the first right opening such that the periphery of the first right opening is aligned with the at least one guide slot of the right main nut body component. The right nut body is then rotated so as to trap the periphery of the first right opening between the right entry boss and the right main nut body head. At this position, the snap feature of the right satellite nut body component is aligned over the second right opening, and the snap feature thereof is thereupon pressed snappingly into the second right opening. The left nut body is similarly mounted to the first and second left openings of the attachment panel. Finally, the mounting holes of the license plate of a particular country are aligned to an appropriate pair of license plate attachment holes of the left and right nut bodies, and thereupon a threaded fastener is threaded respectively into the aligned license plate attachment holes to thereby secure the license plate onto the attachment panel, which is, itself connected to the motor vehicle.

Accordingly, it is an object of the present invention to provide a license plate attachment system which accommodates attachment to a motor vehicle a number of license plates from various countries, wherein the license plates may have differing locations of the mounting holes formed therein.

This and additional objects, features and advantages of the present invention will become clearer from the following specification of a preferred embodiment.

BRIEF DESCRIPTION OF THE DRAWINGS

FIG. 4A is a bottom plan view of the left nut body of FIG. 1.

FIG. 4B is a bottom plan view the right nut body of FIG. 2B.

FIG. 5 is an exploded, perspective, view of the left nut body of FIG. 1.

FIG. 5A is a side view seen along line 5A—5A of FIG. 5.

FIG. 6 is a sectional view of the left nut body of FIG. 1, seen along line 6—6 of FIG. 2A.

FIG. 7 is a side view showing the left and right nut bodies at a first stage of attachment to the attachment panel.

FIG. 8 is a side view as in FIG. 7, now showing the left and right nut bodies at a second and final stage of attachment to the attachment panel.

FIG. 9A is a sectional view as in FIG. 6 of the left nut body, now shown at the final attachment stage with respect to the attachment panel.

FIG. 9B is sectional view, seen along line 9B—9B of FIG. 9A.

DESCRIPTION OF THE PREFERRED EMBODIMENT

Figure 1:
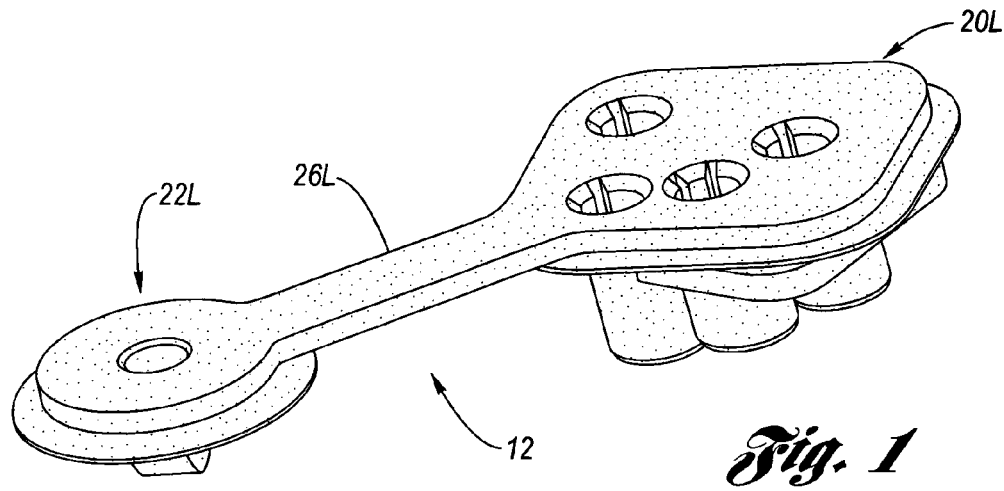
FIG. 1 is a perspective view of a left nut body according to the present invention.

Referring now to the Drawing, FIG. 8 depicts a license plate attachment system 10 according to the present invention. The license plate attachment system includes a left nut body 12, a right nut body 14 and an attachment panel 16 to which the left and right nut bodies are attachable. The left and right nut bodies 12, 14 have corresponding license plate attachment holes 26 which form pairs of mutually cooperating license plate attachment holes, each pair having predetermined mutual spacing between the holes to thereby provide alignment with the mounting holes of predetermined sizes of license plates.

Figures 2A, 2B:
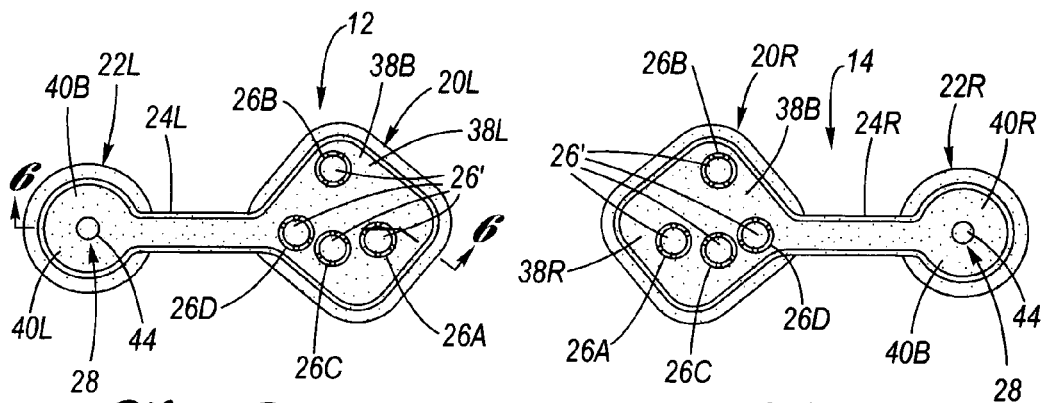
FIG. 2A is a top plan view of the left nut body of FIG. 1.
FIG. 2B is a top plan view of a right nut body according to the present invention.

Referring now to FIGS. 1 through 2B, the left nut body 12 is shown, which is generally a mirror image of the right nut body 14. The left and right nut bodies 12, 14 have respective left and right main nut body components 20L, 20R, a respective left and right satellite nut body component 22L, 22R, and a respective bridge 24L, 24R connecting together each left and right main nut body component with its respective left and right satellite nut body component. Each of the left and right main nut body components 20L, 20R has at least one selected license plate attachment hole, forming, in combination, at least one cooperating pair of license plate attachment holes. It is preferred for four license plate attachment holes to be provided in each of the left and right main nut body components 20L, 20R, namely, a North American license plate attachment hole 26A, a Japanese license plate attachment hole 26B, a Korean license plate attachment hole 26C, and a Persian Gulf States license plate attachment hole 26D. As further shown by FIGS. 2A and 2B, each of the left and right satellite nut body components 22L, 22R has provision for a respective centrally disposed European license plate mounting hole 28.

Figure 3:
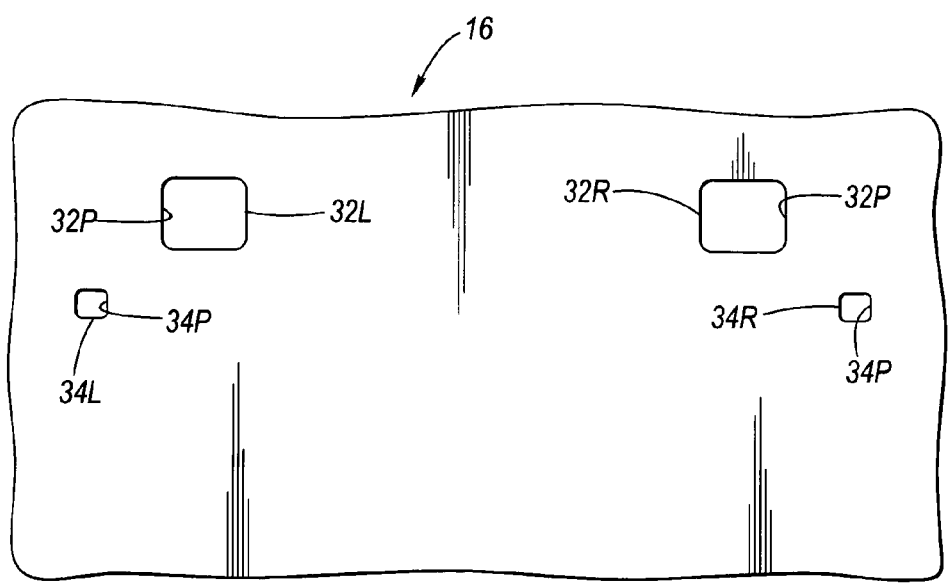
FIG. 3 is a side plan view of an attachment panel according to the present invention.

FIG. 3 shows the attachment panel 16, which includes first and second left openings 32L, 34L and first and second right openings 32R, 34R. The left and right main nut body components 20L, 20R are structured to fastenably cooperate with the periphery 32P of the first left and right openings 32L, 32R, and the left and right satellite nut body components 22L, 22R are structured to fastenably cooperate with the periphery 34P of the second left and right openings 34L, 34R, as will be detailed hereinbelow. When the left and right nut bodies 12, 14 are attached to the attachment panel, the relative positioning of the aforementioned license plate attachment holes are predetermined to provide pairs of license plate attachment holes, each of which being alignable with the mounting holes of a respective license plate, to wit: a pair of North American license plate attachment holes 26A which are alignable with the mounting holes of a North American license plate, a pair of Japanese license plate attachment holes 26B which are alignable with the mounting holes of a Japanese license plate, a pair of Korean license plate attachment holes 26C which are alignable with the mounting holes of a Korean license plate, a pair of Persian Gulf States license plate attachment holes 26D which are alignable with the mounting holes of a Persian Gulf States license plate, and a pair of European license plate attachment holes which are alignable with the mounting holes of a European license plate.

Each of the left and right main nut body components 20L, 20R has a respective left and right main nut body head 38L, 38R. As shown at FIGS. 4A through 6, it is preferred for the license plate attachment holes 26A–26D to be in the form of blind bores 26' defined by closed-end cylindrical casings 26" which are integrally formed with a rear side 38A of each of the left and right main nut body heads 38L, 38R in perpendicular relation thereto such that the blind bores open at a front side 38B of the left and right main nut body heads. In this regard, a threaded fastener may be threaded into a blind bore 26', and if later backed out, the blind bore remains intact, without breakage. This feature is particularly useful should a user accidentally drive a threaded fastener into a "wrong" license plate attachment hole 26A–26D, in that environmental integrity is maintained. The blind bores 26' preferably have four axially disposed flutes for facilitating threading thereinto by a threaded fastener.

Each of the left and right satellite nut body components 22L, 22R has a respective left and right satellite nut body head 40L, 40R and a respective pair of legs 42 perpendicularly projecting from a rear side 40A of each of the respective left and right satellite nut body heads, wherein a semi-cylindrical cut-out is formed in each leg of the pairs of legs in bilateral disposition to form a threaded fastener receptacle 46. At the front side 40B of the satellite nut body heads 40L, 40R, a piercible recess surface 44 is formed which demarcates an entry location for a threaded fastener. The recess surface 44 is aligned with the threaded fastener receptacle 46, such that piercing of the recess surface results in a threaded fastener passing therethrough and threadably engaging the threaded fastener receptacle.

Each pair of legs 42 has a snap feature 48 in the form of radially oriented V-shaped surfaces disposed opposite the threaded fastener receptacle 46. A grommet 50 is provided with each of the left and right satellite nut bodies 22L, 22R as a separate, snap-on piece. Each grommet 50 has a down-turned peripheral grommet lip 52 and a central aperture 54, wherein each grommet is snap fit onto a respective pair of legs 42 via interaction of its snap feature 48 with the periphery of the central aperture.

As shown best at FIGS. 4A through 5, an entry boss 60L, 60R is attached, respectively, to each of the rear side 38A of the main nut body heads 38L, 38R, preferably by sonic welding. In this regard, the rear side 38A of each of the left and right main nut body heads 38L, 38R is provided with alignment pins 62 which are received into cooperating alignment holes 64 of its respective entry boss 60L, 60R. Additionally, each of the left and right entry bosses 60L, 60R is provided with cylindrical casing holes 66 for receiving therethrough the cylindrical casings 26" of its respective left and right main nut body head 38L, 38R.

As indicated at FIGS. 4A, 4B and 5A, the sidewall 68 of each of the left and right entry bosses 60L, 60R is provided with at least one guide slot 70 (four guide slots being shown, one guide slot at each side of the sidewall) running from a midpoint M and passing through a respective corner C thereof. As shown at FIG. 5A, each guide slot 70 is tapered, having its least height H at the corner C and maximum height at the midpoint M, the purpose of which will become clear momentarily. FIGS. 4A and 4B show that each guide slot cuts into the sidewall 68 with a shallow diagonal, having least depth at the midpoint and maximum depth at the corner.

The rear side 38A of each of the left and right main nut body heads 38L, 38R has a down turned peripheral main head lip 72. As can be understood best from FIGS. 4A and 4B, the orientation of the entry bosses 60L, 60R is skewed relative to the periphery of their respective left and right main nut body heads 38L, 38R, as for example a skew angle S of 20.15 degrees (see FIG. 4B). This skewing is predetermined so as to provide proper operation with respect to the first and second left and right openings 32R, 32L, 34R, 34L, respectively, as will become clear momentarily.

Referring again to FIG. 3, the second left and right openings 34L, 34R are located on the attachment panel 16 such that the distance between the respective centers thereof is equal to the distance between the center of each of the mounting holes of a European license plate. Accordingly, by placing the satellite nut body components 22L, 22R respectively at the second left and right openings 34L, 34R, the European attachment holes 28 (each composed of the threaded fastener receptacle 46 thereof and piercing of the recess surface 44 thereat) are aligned with the license plate mounting holes of a European license plate. In this regard, the snap feature 48 of each of the satellite nut body components snappingly engages the periphery of its respective second left and right opening 22L, 22R when pushed thereinto.

Now, with the satellite nut body components 22L, 22R located at the respective second left and right openings 22L, 22R, the respective bridges 24L, 24R orient the main nut body components 20L, 20R such that their respective license plate attachment holes 26A–26D form pairs of license plate attachment holes, each pair having holes being spaced so as to be alignable with the mounting holes of a license plate of a particular country. That is, the North American license plate attachment holes 26A form a pair of North American license plate attachment holes which are spaced for alignment with the mounting holes of a North American license plate, the Japanese license plate attachment holes 26B form a pair of Japanese license plate attachment holes which are spaced for alignment with the mounting holes of a Japanese license plate, the Korean license plate attachment holes 26C form a pair of Korean license plate attachment holes which are spaced for alignment with the mounting holes of a Korean license plate, and the Persian Gulf States license plate mounting holes 26D form a pair of Persian Gulf attachment holes which are spaced for alignment with the mounting holes of a Persian Gulf States license plate.

It is preferred for the left and right nut bodies 12, 14, including the entry bosses 60L, 60R and the grommets 44 be composed of a nylon material, however, other corrosion resistant, durable materials may be used.

Tool-free installation of the left and right nut bodies 12, 14 with respect to the attachment panel 16 will now be described with reference to FIGS. 7 through 9B.

Firstly, each entry boss 60L, 60R is placed into its respective first left and right opening 32L, 32R. In this regard, the entry bosses 60L, 60R and the first left and right openings 32L, 32R are of complementing rectangular shapes which define a respectively exclusive entry orientation of the left and right nut bodies 12, 14 whereby the respective satellite nut body components 22L, 22R are located generally adjacent their respective second left and right openings 34L, 34R, as defined by the aforementioned skew angle. In the position shown at FIG. 7, the main head lip 72 abuts the attachment panel 16 and the at least one guide slots 70 are aligned with the periphery of the first left and right openings 32L, 32R.

Next, the left and right nut bodies 12, 14 are rotated along respective arrows A, A', such that the satellite nut body components 22L, 22R are aligned over their respective second left and right openings 34L, 34R of the attachment panel 16 (see FIG. 8), again as defined by the skew angle. In performing the rotation, the periphery of the first left and right openings 32L, 32R is increasingly tightly trapped in the at least one guide slots 70 as the height of the at least one guide slots decreases with respect to the respective left and right main body washer head 38L, 38R (see FIG. 9A). Now the satellite nut body components 22L, 22R are pressed toward the attachment panel 16, thereby forcing the snap feature 48 into the respective second left and right openings 34L, 34R (see FIG. 9B). Upon completion of installation, the grommet and main head lips 52, 72 are in firmly abutting relation with the attachment panel so as to thereby provide a sealing relationship therebetween.

FIGS. 10A through 20E depict the license plate attachment system 10 in operation with respect to license plates of various countries.

Figure 10A:
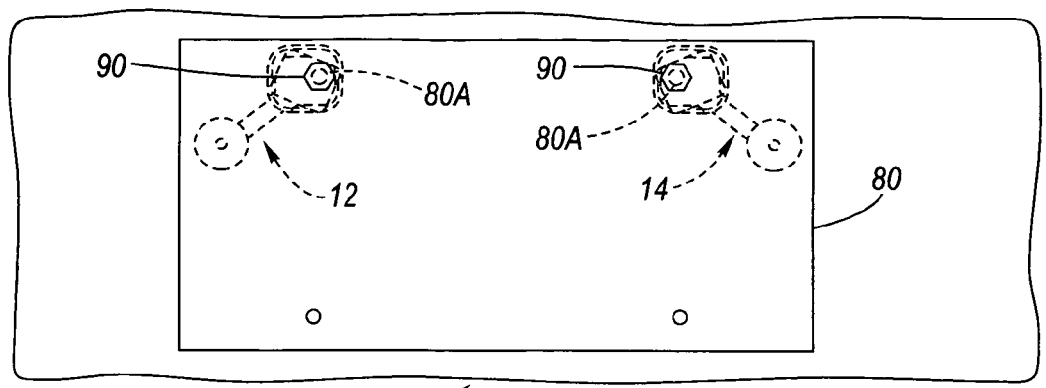
FIG. 10A is a side view of a North American license plate mounted to the left and right nut bodies which are, in turn, attached to the attachment panel according to the present invention.

In FIG. 10A, a North American license plate 80 has mounting holes 80A which are aligned with the North American attachment holes 26A, and a threaded fastener 90 has been respectively passed through each of the mounting holes 80A and threaded into each of the North American license plate attachment holes 26A so as to thereby attach the North American license plate to the attachment panel 16, and, consequently, the motor vehicle.

Figure 10B:
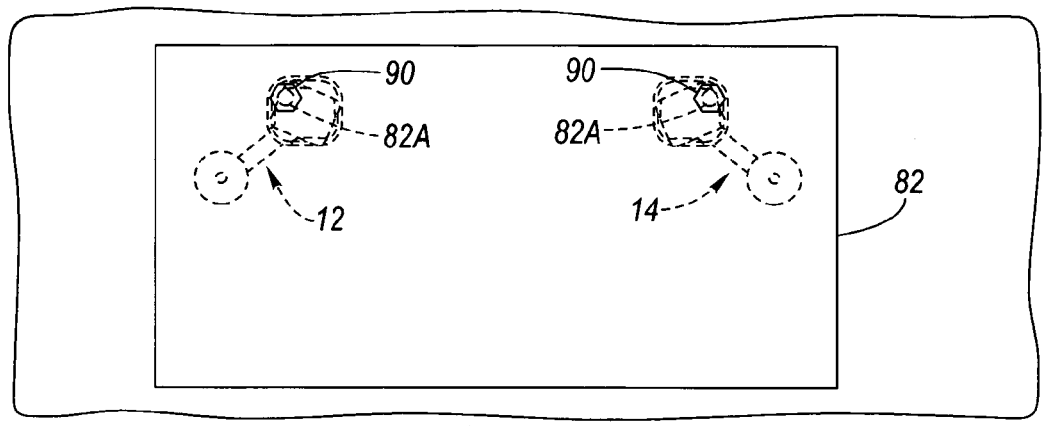
FIG. 10B is a side view of a Japanese license plate mounted to the left and tight nut bodies which are, in turn, attached to the attachment panel according to the present invention.

In FIG. 10B, a Japanese license plate 82 has mounting holes 82A which are aligned with the Japanese attachment holes 26B, and a threaded fastener 90 has been passed respectively through each of the mounting holes 82A and threaded into each of the Japanese license plate attachment holes 26B so as to thereby attach the Japanese license plate to the attachment panel 16, and, consequently, the motor vehicle.

Figure 10C:
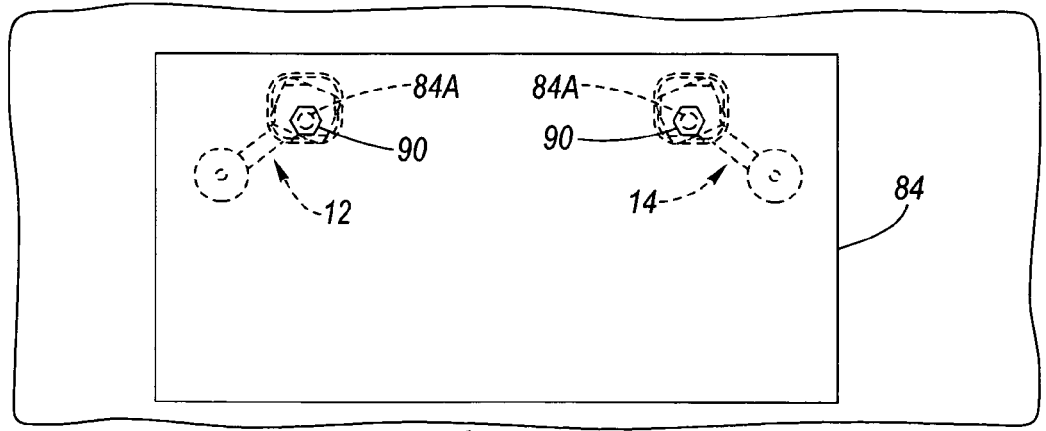
FIG. 10C is a side view of a Korean license plate mounted to the left and right nut bodies which are, in turn, attached to the attachment panel according to the present invention.

In FIG. 10C, a Korean license plate 84 has mounting holes 84A which are aligned with the Korean attachment holes 26C, and a threaded fastener 90 has been respectively passed through each of the mounting holes 84A and threaded into each of the Korean license plate attachment holes 26C so as to thereby attach the Korean license plate to the attachment panel 16, and, consequently, the motor vehicle.

Figure 10D:
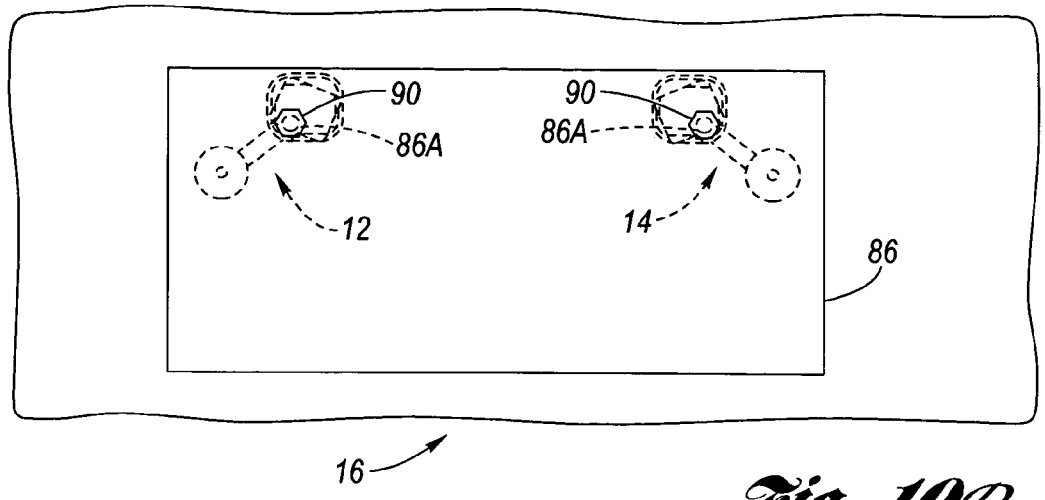
FIG. 10D is a side view of a Persian Gulf States license plate mounted to the left and right nut bodies which are, in turn, attached to the attachment panel according to the present invention.

In FIG. 10D, a Persian Gulf States license plate 86 has mounting holes 86A which are aligned with the Persian Gulf States attachment holes 26D, and a threaded fastener 90 has been respectively passed through each of the mounting holes 86A and threaded into each of the Persian Gulf States license plate attachment holes 26D so as to thereby attach the Persian Gulf States license plate to the attachment panel 16, and, consequently, the motor vehicle.

Figure 10E:
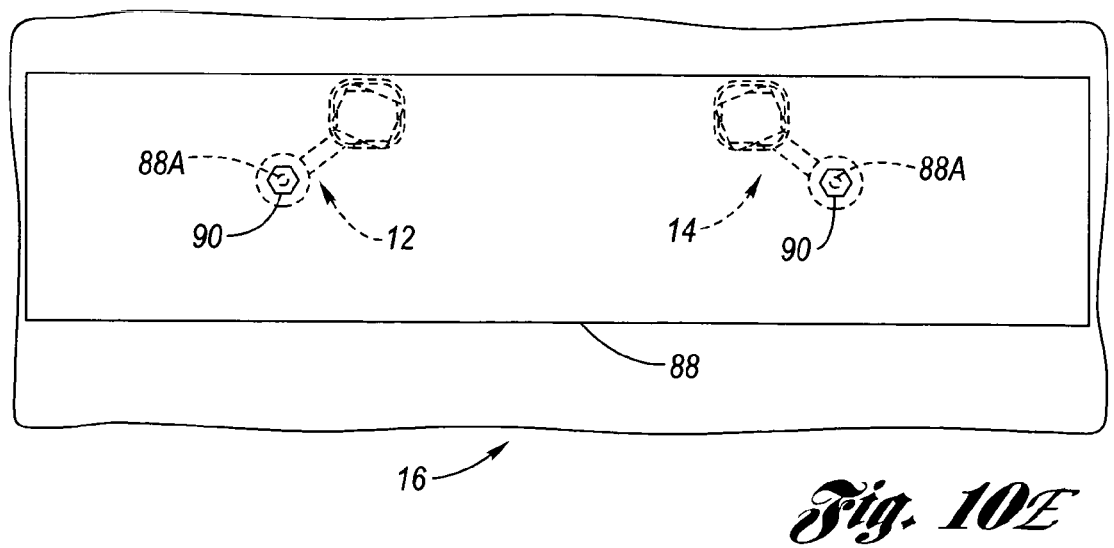
FIG. 10E is a side view of a European license plate mounted to the left and right nut bodies which are, in turn, attached to the attachment panel according to the present invention.

In FIG. 10E, a European license plate 88 has mounting holes 88A which are aligned with the European attachment holes 28, and a threaded fastener 90 has been respectively passed through each of the mounting holes 88A, pierced each of the recesses 44 and threaded into each of the European license plate attachment holes 28 so as to thereby attach the European license plate to the attachment panel 16, and, consequently, the motor vehicle.

To those skilled in the art to which this invention appertains, the above described preferred embodiment may be subject to change or modification. For example, the bridges could be omitted. Such change or modification can be carried out without departing from the scope of the invention, which is intended to be limited only by the scope of the appended claims.

The invention claimed is:

1. A license plate attachment system for attaching to a motor vehicle a license plate selected from at least two license plates having differing mounting hole locations, said license plate attachment system comprising:
   an attachment panel having a left opening and a right opening, said right opening being spaced a predetermined distance from said left opening;
   a left main nut body component attached to said attachment panel at said left opening at a first fixed orientation with respect to said attachment panel, said left main nut body component having a first plurality of license plate attachment holes formed therein; and
   a right main nut body component attached to said attachment panel at said right opening at a second fixed orientation with respect to said attachment panel, said right main nut body component having a second plurality of license plate attachment holes formed therein;
   wherein said first and second plurality of license plate attachment holes comprise at least two of: a pair of North American license plate attachment holes alignable with mounting holes of a North American license plate, a pair of Japanese license plate attachment holes alignable with mounting holes of a Japanese license plate, a pair of Korean license plate attachment holes alignable with mounting holes of a Korean license plate, and a pair of Persian Gulf States license plate attachment holes alignable with mounting holes of a Persian Gulf States license plate
   wherein said first fixed orientation of said left main nut body component is independent of said second fixed orientation of said right main nut body component
   wherein each of said license plate attachment holes comprises a blind bore formed in a closed end casing; and wherein said left main nut body component comprises a left main nut body head and a left entry boss, at least one first guide slot being formed in said left entry boss, wherein said left entry boss is receivable into said first left opening, and wherein rotation of said left main nut body component results in attachment of said left nut body to said attachment panel by a periphery of said first left opening being trapped in said at least one first guide slot; and
   said right main nut body component comprises a right main nut body head and a right entry boss, at least one second guide slot being formed in said right entry boss, wherein said right entry boss is receivable into said first right opening, and wherein rotation of said right main nut body component results in attachment of said right nut body to said attachment panel by a periphery of said first right opening being trapped in said at least one second guide slot.

2. The license plate attachment system of claim 1, wherein a main head lip is formed respectively on each of said left and right main nut body heads, wherein each said main head lip is in sealing relation to said attachment panel when said left and right nut body components are attached thereto.

3. The license plate attachment system of claim 2, wherein:
   each of said right and left openings has a predetermined shape, and each of said left and right entry bosses has a shape complementary to the predetermined shape; and
   each of said left and right entry bosses has an orientation skewed in relation to its respective left and right main nut body head.

4. The license plate attachment system of claim 3, wherein said first and second plurality of license plate attachment holes comprise: a pair of North American license plate attachment holes alignable with mounting holes of a North American license plate, a pair of Japanese license plate attachment holes alignable with mounting holes of a Japanese license plate, a pair of Korean license plate attachment holes alignable with mounting holes of a Korean license plate, and a pair of Persian Gulf States license plate attachment holes alignable with mounting holes of a Persian Gulf States license plate.

5. The license plate attachment system of claim 3, wherein said attachment panel further has a second left opening and a second right opening, said second left opening being spaced a second predetermined distance from said second right opening; further comprising:
   a left satellite nut body component attached to said attachment panel at said second left opening, said left satellite nut body component having a first European license plate attachment hole formed therein;
   a first bridge connecting said left main nut body component to said left satellite nut body component;
   a right satellite nut body attached to said attachment panel at said second right opening, said right satellite nut body component having a second European license plate attachment hole formed therein; and
   a second bridge connecting said right main nut body component to said right satellite nut body component;
   wherein said skewing of said left entry boss relative to said left main body head places said left satellite nut body component into alignment with said second left opening after said rotation of said left main nut body component;
   wherein said skewing of said right entry boss relative to said right main body head places said right satellite nut body component into alignment with said second right opening after said rotation of said right main nut body component; and
   wherein said first and second European license plate mounting holes are alignable with mounting holes of a European license plate.

6. The license plate attachment system of claim 5, wherein said first and second plurality of license plate attachment holes comprise: a pair of North American license plate attachment holes alignable with mounting holes of a North American license plate, a pair of Japanese license plate attachment holes alignable with mounting holes of a Japanese license plate, a pair of Korean license plate attachment holes alignable with mounting holes of a Korean license plate, and a pair of Persian Gulf States license plate attachment holes alignable with mounting holes of a Persian Gulf States license plate.

7. A license plate attachment system for attaching to a motor vehicle a license plate selected from at least two license plates having differing mounting hole locations, said license plate attachment system comprising:
   an attachment panel having a left opening and a right opening, said right opening being spaced a predetermined distance from said left opening;
   a left main nut body component attached to said attachment panel at said left opening at a first fixed orientation with respect to said attachment panel, said left main nut body component having a first plurality of license plate attachment holes formed therein; and
   a right main nut body component attached to said attachment panel at said right opening at a second fixed orientation with respect to said attachment panel, said right main nut body component having a second plurality of license plate attachment holes formed therein;
   wherein said first fixed orientation of said left main nut body component is independent of said second fixed orientation of said right main nut body component;
   wherein said attachment panel further has a second left opening and a second right opening, said second left opening being spaced a second predetermined distance from said second right opening; further comprising:
   a left satellite nut body component attached to said attachment panel at said second left opening, said left satellite nut body component having a first European license plate attachment hole formed therein; and
   a right satellite nut body attached to said attachment panel at said second right opening, said right satellite nut body component having a second European license plate attachment hole formed therein;
   wherein said first and second European license plate mounting holes are alignable with mounting holes of a European license plate.

8. The license plate attachment system of claim 7, wherein:
   said left satellite nut body component comprises a left satellite head, and a left threaded fastener receptacle connected with said left satellite head which provides at least in part said first European license plate attachment hole; and
   said right satellite nut body component comprises a right satellite head, and a right threaded fastener receptacle connected with said right satellite head which provides at least in part said second European license plate attachment hole.

9. The license plate attachment system of claim 8, wherein said left satellite head has a first piercible surface aligned with said left threaded fastener receptacle, and wherein said right satellite head has a second piercible surface aligned with said right threaded fastener receptacle.

10. The license plate attachment system of claim 9, further comprising:
   a first snap feature connected with said first threaded fastener receptacle, wherein said first snap feature snaps into said second left opening to thereby secure said left satellite nut body component to said attachment panel at said second left opening thereof; and
   a second snap feature connected with said second threaded fastener receptacle, wherein said second snap feature snaps into said second right opening to thereby secure said right satellite nut body component to said attachment panel at said second right opening thereof.

11. The license plate attachment system of claim 10, further comprising a grommet respectively connected to each of said left and right satellite heads at the respective left and right snap feature thereof, each said grommet having a grommet lip, wherein each said grommet lip is in sealing relation to said attachment panel when said left and right nut satellite body components are attached thereto.

12. A license plate attachment system for attaching to a motor vehicle a license plate selected from at least two license plates having differing mounting hole locations, said license plate attachment system comprising:
   an attachment panel having a left opening and a right opening wherein said right opening is spaced a predetermined distance from said left opening, said attachment panel further having a second left opening and a second right opening wherein said second left opening is spaced a second predetermined distance from said second right opening;
   a left main nut body component attached to said attachment panel at said left opening, said left main nut body component having a first plurality of license plate attachment holes formed therein;
   a right main nut body component attached to said attachment panel at said right opening, said right main nut body component having a second plurality of license plate attachment holes formed therein;
   a left satellite nut body component attached to said attachment panel at said second left opening, said left satellite nut body component having a first European license plate attachment hole formed therein;
   a first bridge connecting said left main nut body component to said left satellite nut body component;
   a right satellite nut body attached to said attachment panel at said second right opening, said right satellite nut body component having a second European license plate attachment hole formed therein; and
   a second bridge connecting said right main nut body component to said right satellite nut body component.

13. The license plate attachment system of claim 12, wherein:
   said left main nut body component comprises a left main nut body head and a left entry boss, at least one first guide slot being formed in said left entry boss, wherein said left entry boss is receivable into said first left opening, and wherein rotation of said left main nut body component results in attachment of said left nut body to said attachment panel by a periphery of said first left opening being trapped in said at least one first guide slot;
   said right main nut body component comprises a right main nut body head and a right entry boss, at least one second guide slot being formed in said right entry boss, wherein said right entry boss is receivable into said first right opening, and wherein rotation of said right main nut body component results in attachment of said right nut body to said attachment panel by a periphery of said first right opening being trapped in said at least one second guide slot;

each of said left and right entry bosses has an orientation skewed in relation to its respective left and right main nut body head, wherein said skewing of said left entry boss relative to said left main body head places said left satellite nut body component into alignment with said second left opening after said rotation of said left main nut body component, and wherein said skewing of said right entry boss relative to said right main body head places said right satellite nut body component into alignment with said second right opening after said rotation of said right main nut body component.

14. The license plate attachment system of claim 13, wherein said first and second plurality of license plate attachment holes comprise: a pair of North American license plate attachment holes alignable with mounting holes of a North American license plate, a pair of Japanese license plate attachment holes alignable with mounting holes of a Japanese license plate, a pair of Korean license plate attachment holes alignable with mounting holes of a Korean license plate, and a pair of Persian Gulf States license plate attachment holes alignable with mounting holes of a Persian Gulf States license plate.

15. The license plate attachment system of claim 14, wherein each said license plate attachment holes of said left and right main nut body components comprises a blind bore formed in a closed end casing.

* * * * *